June 24, 1969     D. L. JORDAN     3,451,067
HEART VALVE

Filed June 16, 1966

INVENTOR:
Daniel Lazo Jordan

BY: *Harold W. Bergendorf*

ATTORNEY

June 24, 1969  D. L. JORDAN  3,451,067
HEART VALVE
Filed June 16, 1966
Figure 7
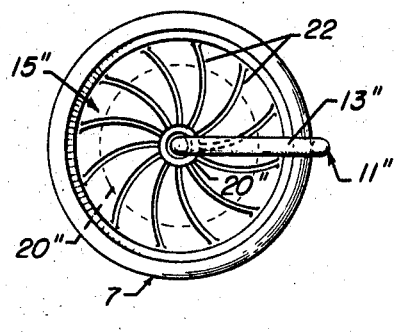
Figure 8
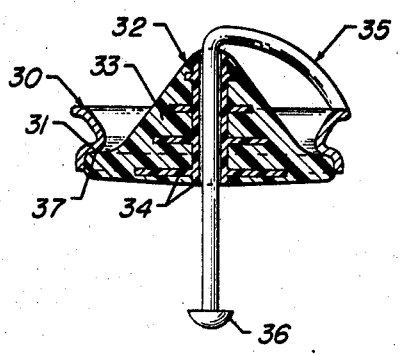
Figure 9
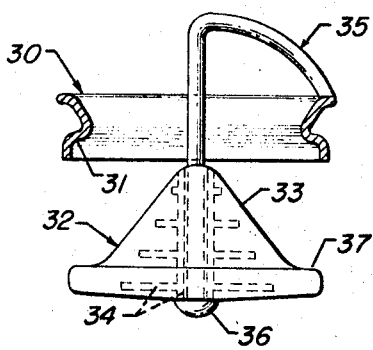
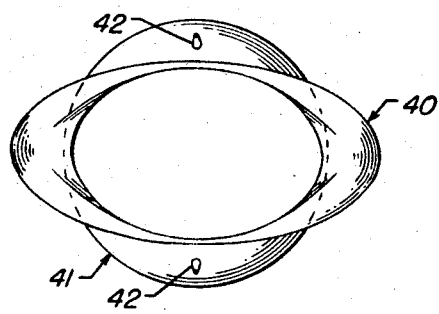
Figure 10
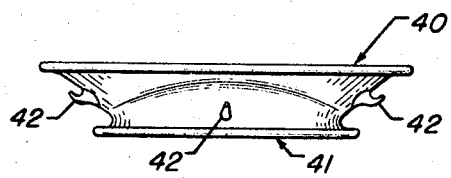
Figure 11
INVENTOR:
Daniel Lazo Jordan
BY:
Harold W. Bergendorf
ATTORNEY

United States Patent Office 3,451,067
Patented June 24, 1969

3,451,067
HEART VALVE
Daniel Lazo Jordan, 6400 N. Tahoma,
Chicago, Ill. 60646
Filed June 16, 1966, Ser. No. 557,956
Int. Cl. A67f 1/22; F16k 15/06, 29/00
U.S. Cl. 3—1                                    10 Claims

ABSTRACT OF THE DISCLOSURE

An artificial heart valve comprising a ring and a tapered check slidably mounted on a guide rod which is axially disposed through the center of the ring opening. The guide rod is one leg of a cantilevered U-shaped or curved rod, the fixed end of which is attached to the ring. The design minimizes stroke length, permits low resistance to blood flow, and affords positive seating.

---

This invention relates to a valve to be installed in a heart by cardiac surgery. More specifically this invention relates to an improved artificial heart valve suitable to replace damaged natural valves in human beings and animals.

In many patients the malfunctioning of one or more of the heart valves may be either the sole cause or an important cause of the patient's heart ailment. The heart valves may be damaged by disease or abnormal from other causes (e.g. congenital) so as to impair the function of the heart in pumping blood through the various organs and tissues of the body. It has been found possible through cardiac survery to replace the original natural heart valve structure with an artificial valve which will substantially restore the normal function of the heart.

The substitution of an artificial heart valve creates many problems. The materials of construction of the valve must be compatible with the chemicals and tissues in the human body and must be physiologically chemically inert. These foreign materials tend to cause the development of blood clots on their surface which may break off and locate in positions which can restrict or even stop the flow of blood. It has been found that blood clots tend to form in relatively stagnant zones in these artificial heart valves (areas where blood flow velocity is very low, and also in areas of resistance to flow. Those artificial valves function as check valves ideally permitting blood to flow in one direction only. It is preferable that the artificial valve seat rapidly and with a sure decisive motion to prevent regurgitation, another probable cause of blood clotting (flowing of blood back upstream).

One of the most common prior artificial heart valves is that called the ball cage valve. These valves have been successfully used as artificial heart valves in human hearts. These ball cage valves have several objections the primary ones tabulated as follows: (1) the ball and cage offers a substantial impediment of blood flow due to the valve configuration (large cross sectional area occupied by the ball); (2) there is a tendency to form blood clots on the ventricular surface of the ring and on the rods at their juncture with the rim; (3) the length and size of the cage needed to insure adequate flow and volume of blood may be too large for a functioning ventricle thereby causing an aneurism of the ventricle wall; (4) this length and size problem may also cause penetration of the inter-ventricular septum; (5) due to the freedom of lateral motion of the ball, its physical configuration, the resiliency of the ball material and the capillary flow pattern of the blood while the ball is in its seating motion (just before the valve closes) the ball does not always seat positively. The ball may bounce back at this point causing regurgitation of the blood into the atrium before seating itself into the valve. It is thought that regurgitation can cause blood clot formation; (6) because of the freedom of movement of the ball within the cage and the forces of blood thereon the ball can actually become dislodged from the cage; and (7) the ball can possibly injure and destroy blood cells (called hemolysis) while seating in the valve.

It is an object of the present invention to produce an artificial heart valve overcoming or minimizing these problems.

It is another object of this invention to produce an efficient, dependable and improved artificial heart valve.

It is still another object of this invention to minimize the formation of blood clots in artificial heart valves.

It is a further object of this invention to minimize the stroke length between the open and closed position in an artificial heart valve.

It is another object of this invention to minimize the impediment or resistance to blood flow through an artificial heart valve.

It is a further object of this invention to increase the volume of blood flow through, reduce the time to open or close and/or minimize the stroke length of an artificial heart valve.

It is still a further object of this invention to minimize hemolysis in the closing of artificial heart valves.

It is another object of this invention to eliminate dislodgement of the check valve in aritifical heart valves.

It is a still further object of this invention to use materials of construction in an artificial heart valve to maintain chemical inertness between the heart and the artificial valve and to provide a structurally sound, dependable valve.

It is a more specific object of this invention to impart a twisting motion to the movable check in an artificial heart valve to prevent localized wearing and attain a positive, firm seal when the valve closes.

It is another more specific object of this invention to employ a tapered check valve to attain a firm, positive seal when the valve is closed, and permit low resistance to flow of blood therethrough when the valve is open.

FIGURE 7 is a top view of FIGURE 6.

FIGURE 8 shows a cross-sectional side view of a third preferable embodiment of an artificial heart valve in the closed position having a different shape tapered check, an alternate seating position and a modified rod attachment.

FIGURE 9 shows the valve of FIGURE 8 in the open position.

FIGURE 10 shows a top view of an alternately shaped ring used in an artificial heart valve.

FIGURE 11 shows a side view of FIGURE 10.

The flow of blood through the heart is briefly described hereinafter. The oxygen depleted blood flows from the veins into the right atrial chamber of the heart whereupon it flows into the right ventricular chamber. The blood is discharged from the right ventricular chamber where it flows through the lungs wherein it picks up oxygen. The oxygen rich blood flows from the lungs into the left atrial chamber and then into the left ventricular chamber and out the aorta and into the system of arteries throughout the body to deliver oxygen enriched blood to the various organs and tissues of the body.

The functioning of the heart valves may be described with reference to the mitral valve which connects the atrial chamber with the ventricular chamber. When the ventricular chamber muscles contract, said mitral valve closes thus preventing the flow of blood back into the atrial chamber. Another valve called the aortic valve is located at the out-flow of the ventricular chamber through which blood discharges from the heart and flows throughout the body. Thus when the ventricular chamber muscle contracts, not only is the mitral valve forced closed, but also the aortic valve is forced open. The improved valve of this invention can readily be employed in any of the natural heart valve positions although the dimensions will vary depending on location and upon individual patients.

Figure 1:
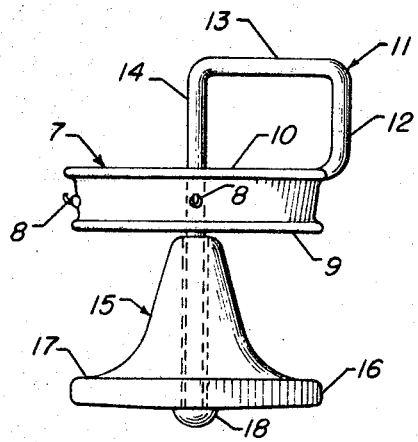
FIGURE 1 is a side view of a preferable embodiment of a heart valve shown in an open position.

The operation of the valve is more clearly seen with reference to the figures on the drawing. FIGURE 1 shows a preferable embodiment of this invention. In FIGURE 1, U-shaped member 11 is shown attached to ring 7, said member 11 being formed by a first rod 12, a cross rod 13 and a second rod 14. A tapered check 15, is mounted on second rod 14 and is slidable thereover. The tapered check contains a lip edge 16 having a surface 17 which contacts ring 7 when the valve is in the closed position (see FIGURE 2). A stop 18 is attached to the end of second rod 14 to limit the maximum opening of the valve. The ring 7 has a circular opening port through which bloods flows. The ring contains an upstream circular ridge 10 and a downstream circular ledge 9, said downstream ledge having a convex surface a portion of which seats against surface 17 when the valve is closed. It is thought that hemolysis is minimized when the check valve seats against a convex surface. The valve opens and closes by sliding along rod 14. In FIGURE 1 the valve is shown in the maximum open position with the blood flowing vertically downward in the drawing through the port opening in the ring and through the annulus formed between surface 17 and ledge 9. It is desired that when the valve is in the maximum open position the cross-sectional area of said annulus is at least about 50% of the cross-sectional area of the port opening in the ring and preferably 100% or even greater in order to minimize resistance to blood flow when open and still permit short times for the valve to close. Therefore, the position of stop 18 along the length of rod 14 is selected to attain this preferable cross-sectional area relationship. This valve may be attached to the heart by any well-known means such as attaching a collar to the ring and sewing the cloth onto the heart. Preferably the collar is attached to the rings by means of hooks 8 shown in FIGURE 1. The terms upstream and downstream refer to positions relative to the direction of blood flow. In FIGURE 1 blood flows from top to bottom through the valve and any point being above the ring is upstream relative to the ring while any point being below the ring is downstream of the ring. Thus in this embodiment the U part of member 11 is actually upstream of the ring in the atrial chamber and the ventricular chamber is downstream of the valve.

As was mentioned earlier there is a tendency for blood clots to form on the juncture of the rod cage with the ring in the ball check heart valve. One advantage of this embodiment is the minimum amount of non-functional rod length thus minimizing rod surface on which clots can form. Furthermore the sliding of the tapered check will serve to keep the second rod free of blood clots by continually cleaning said rod as it slides thereover due to its proximity. Other advantages of this invention comprise: (1) the seating of the lip edge of the tapered check and the convex surface of the ring should minimize hemolysis; (2) the length of travel stroke of the check is minimized (approximately by one-half of a ball check); (3) the seating of the tapered check is positive and direct with no bounce back; (4) dislodgement of the valve check is eliminated because of controlled travel and stops at the terminal points on the travel rod length; (5) minimized dead rod length where blood clots can form; (6) per unit time when valve check starts to open until it closes, there is a maximization of blood volume flow.

Figure 2:
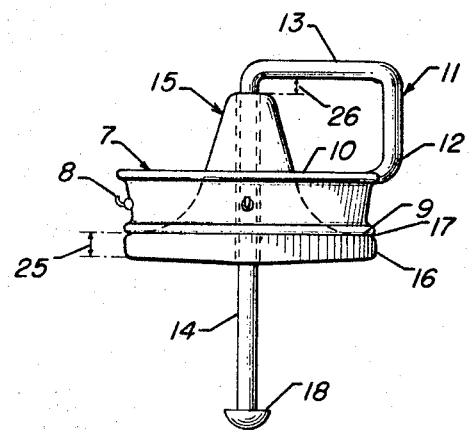
FIGURE 2 is a side view of the same valve as FIGURE 1, except shown in a closed position.

FIGURE 2 shows the same valve as FIGURE 1 except in the closed position. It should be noted that the lip edge 16 of the tapered check contacts downstream circular ledge 9 of the ring htus forming a seal and preventing blood flow from the bottom to the top of the drawing. It is preferable that the thickness of lip edge 16 (shown as number 25) be longer than the thickness between the upstream edge of the tapered check and the outer surface of the cross rod (shown as number 26). This relationship should be maintained in order to insure that the tapered check does not work its way completely into or through the port opening formed by the ring.

Figure 3:
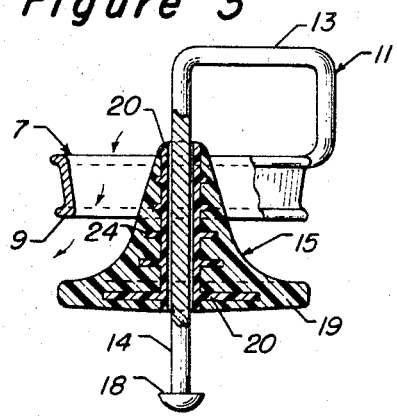
FIGURE 3 shows the same valve as FIGURES 1 and 2 in an intermediate position with a cross-sectional view of the ring and the tapered check.

FIGURE 3 shows a partially opened value with a cross-section of the tapered check, the second rod and the ring. Again U-shaped member 11 is attached to ring 7 as shown in FIGURES 1 and 2. The structural features of the tapered check are important in the functioning of the valve. Preferably the valve is constructed out of skeleton 20 having an outer surface of silicone 19 mounted thereon. The skeleton may be constructed out of materials such as Teflon (polytetrafluoroethylene), Dacron, nylon and other suitable materials. The material should slide over the rod with low resistance. The inner surface of the tapered check which slides over the second rod, called the core, is preferably made out of Teflon. This permits low frictional resistance between the rod and the tapered check since Teflon slides readily over metal. The clearance between the Teflon core and the metal rod is preferably about 2 thousandths of an inch which allows for low resistance sliding along the length of the rod and still prevent any substantial blood passage through this clearance area. The skeleton 20 is composed of the Teflon core and a series of protrusions 24, to add structural strength to the tapered check and give additional surface for the silicone to hold onto thereby firmly maintaining the silicone on the skeleton. It should also be noted that the Teflon core lines up with stop 18 and thus when the valve is fully open the Teflon core directly contacts stop 18 which further minimizes blood clot formation. The direction of blood flow through the valve is shown by arrows in this figure. FIGURE 3 also shows a cross-section of ring 7 and more clearly illustrates the downstream ledge 9 on the ring which the lip edge of the tapered check contacts. It is preferred that the rod, stop and ring be constructed out of metal that is chemically inert to the body and minimizing adverse bodily reactions. The preferable metals comprise cobalt-nickel alloys with Vitallium or Stellite 21 being especially preferred.

Figure 4:
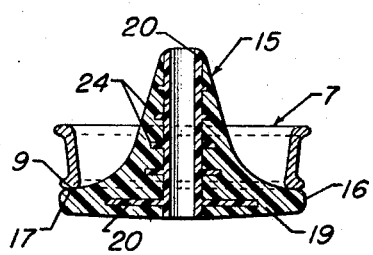
FIGURE 4 shows a detail cross-sectional view of the tapered check in contact with the ring to attain an efficient seal when the valve is closed.

FIGURE 4 shows a detailed cross-section of a portion of the valve in the closed position, more clearly showing the position of ring 7 and tapered check 15 when seated in a closed position. The contact of downstream ledge 9 and the upper side 17 of lip edge 16 is clearly shown therein. It should be noticed that the lip edge of the tapered check is made of silicone which has a certain amount of flexibility thereby aiding in attaining a tight seal. Silicone has the highly desirable feature of minimizing blood clot formation whereas Teflon does not possess this characteristic. Therefore the silicone is used throughout the surface of the tapered check (except for the inner core which is kept free of blood clots by continually sliding over the second rod).

Figure 5:
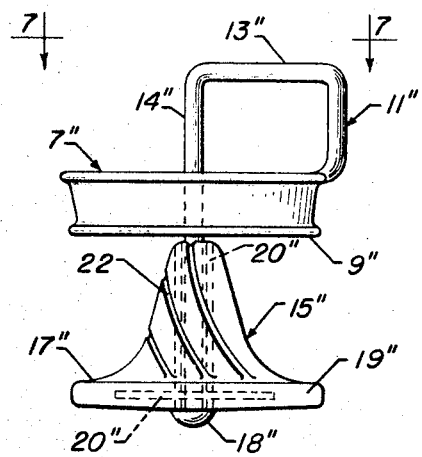
FIGURE 5 is a side view of an alternate preferable embodiment of the present invention.

FIGURE 5 shows an alternate and preferable embodiment of the present invention. Again blood flows from top to bottom of the drawing. In this case, however, the ⊔-shaped member 11' is located downstream of ring 7'. The ⊔ member 11' is formed by a first rod 12', a cross rod 13' and a second rod 14'. The valve functions exactly in the same manner as the embodiment shown in FIGURES 1, 2 and 3. In this case cross rod 13' acts as a stop to limit the maximum opening of the tapered check. In addition, a metal ledge 21 is shown located at the turn of member 11' formed by rods 13' and 14' which gives an additional seat for Teflon core 20' to rest against (thereby minimizing blood clot formation on either the Teflon or on the metal rod). The distance between the lip edge of the tapered check and the first rod 12' shown as number 27 is preferably about 0.5 millimeter which will minimize blood clot formation on rod 12'. Likewise, the maximum distance between the downstream edge of the tapered check and the outer surface of cross rod 13' (shown as number 28) is no more than about 0.5 millimeter, again minimizing blood clot formation on the cross rod. A stop 23 is located at such a point along rod 14' that when the valve is in the closed position, the distance between the upstream edge of the tapered check and stop 23 is preferably less than the thickness of the lip edge 16' of the tapered check. This relationship should be maintained in order to insure that the tapered check does not work its way completely into or through the port opening formed by the ring. Normally stop 23 will not contact the tapered check. Again this tapered check is constructed out of a Teflon skeleton 20' having a silicone outer surface 19'. The valve closes by contact between the downstream ledge 9' in the ring and the upper surface 17' of lip edge 16' of the tapered check.

Figure 6:
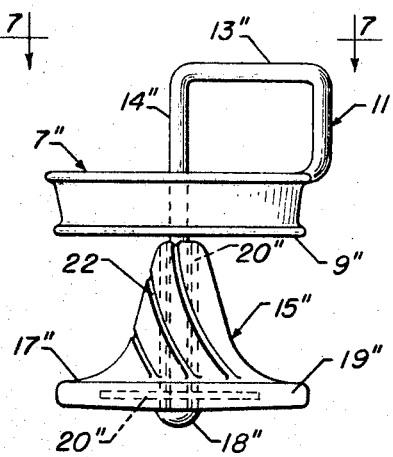
FIGURE 6 shows a side surface view of the tapered check along with surface fluting grooves to impart a twisting motion to said check when the check is opening or closing.

FIGURE 6 shows a heart valve in an open position and contains an alternate design feature of the tapered check to prevent localized wearing and allow positive firm sealing of the valve. A series of grooves 22, called fluting are present in the silicone surface 19'' of tapered check 15''. When the tapered check starts to move (either when opening or closing) the frictional resistance between the blood and the fluting imparts a twisting motion to the tapered check. This serves to prevent localized wearing of the Teflon core or the upper surface 17'' of the tapered check.

FIGURE 7 is a top view of the embodiment shown in FIGURE 6. ⊔ member 11'' is attached to ring 7'' with cross rod 13'' visible. Tapered check 15'' contains surface fluting grooves 22 and Teflon core 20''.

FIGURE 8 shows a third and preferable alternate embodiment of the present invention. This is a modified form of a heart valve in a closed position. As shown therein rod 35 is attached to ring 30 at one end and contains stop 36 at the other end. A tapered check 32 slides over the portion of rod 35 which depends perpendicularly through the opening of the ring. The tapered check is composed of a skeleton 34 (preferably made of Teflon) having a silicone surface 33. In this embodiment tapered check 32 contains a lip edge 37 which seats against surface 31 of the ring. Seating surface 31 is located within the thickness of ring 30 and thus in this embodiment the tapered check lip edge enters the ring and seats therein.

It should be noted that the shape of tapered check is somewhat different than that shown in FIGURES 1-6. This is done to illustrate that by the words tapered check, I only mean that the cross sectional area of the check varies along its length. This generic term is intended to include any shaped check having a variable cross sectional area including but not limited to checks of the following shapes; bell shaped, hat shaped, poly sided shaped, candle shaped, spherical shaped, parabolic shaped, etc. It is preferable that the front portion of the tapered check have substantially less cross-sectional area than the rear portion since this will provide a larger annulus when the valve is open and thus permit maximum blood volume passage.

It should also be noted that the configuration of the rod is slightly different than the ⊔ member shown in FIGURES 1–3 and 5–7. This is done to illustrate that alternate arrangements and configurations of the rod with respect to the ring may be employed. The rod merely serves the purposes of providing a travel rod over which the tapered check slides and securing the travel rod (and thereby the tapered check) in a fixed geometric relationship with the ring.

FIGURE 9 is another view of the heart valve shown in FIGURE 8 except that the valve is in an open position. Rod 35 is connected at one end to ring 30 and a portion of said rod acts as a travel rod over which tapered check 32 travels. Stop 36 connected to the other end of rod 35 limits the maximum opening of the valve. The Teflon skeleton 34 supports the silicone surface 33 of the tapered check. Seating surface 31 and lip edge 37 are more clearly seen in this view.

FIGURE 10 shows an alternate embodiment of the ring which is especially useful in heart valves in the mitral position. The upstream side (the atrium side) is ellipse shaped and the downstream side (the ventrical side) is circular shaped. A similar tapered check as shown in FIGURES 1, 5, or 8 is located downstream of the ring and seats against the circular shaped portion of the ring as described hereinbefore. The purpose of the ellipse shaped portion of the ring is to more equally space the ring from the walls and septum of the atrial chamber and therefore equalize the compression of the atrial heart muscle. The bottom of the atrium is shaped more like an ellipse than a circle and it is easier to center the ring in the atrium with an ellipse shaped ring. FIGURE 10 is a view from the top of this alternate ring embodiment where the upper ellipse ledge 40 is fully shown and the lower circular ledge 41 is partially shown. As shown in FIGURE 10 the blood flow is away from the viewer. Hooks 42 are employed to fasten a cloth collar to the ring, said collar being employed to attach the valve to the heart.

FIGURE 11 is a side view of the embodiment of FIGURE 10 in a right side up position (the blood flows from top to bottom in the drawing). Again, upper ellipse ledge 40 is on top and the lower circular ledge 41 is on the bottom with hooks 42 more clearly visible.

The dimensions of the overall valve are determined by the position in the heart wherein the valve is to be placed and the size of the patient's natural valves. For mitral valves ring port openings of from about 2 cm.$^2$ up to about 3.5 cm.$^2$ will be satisfactory for most patient's valve size with increments of about 0.25 cm.$^2$. The outer diameter of the ring should be from about 20 millimeters up to about 38 millimeters. For aortic valves the cross-sectional ring port area runs from about 1.5 cm.$^2$ up to about 2.8 cm.$^2$ with ring outer diameters of from about 22 up to over 40 millimeters.

It should also be noted that the ring angles into the center of the port in FIGURES 1–6 as one proceeds downstream. This permits smoother blood flow, minimizes blood clots on the inside of the port thickness since there will be no dead zones and also increases blood volume area available at the atrial area ring surface.

It should be borne in mind that the blood circulation system is a closed loop. The heart functions as a positive displacement pump with the heart valves employed to permit unidirectional flow. For this reason it is preferred that the tapered checks in the artificial heart valves of this invention be about the same density as that of blood. This is done to insure that energy expended by contraction of the heart muscle is used primarily to pump blood. For example, if the valve of FIGURE 1 is placed in the mitral position, and if the tapered check is more dense than blood, the ventricular chamber will have to raise the check to the closed position (and therefore expend energy in lifting the more dense tapered check). Thus it is preferred that the check valve not be operated by flotation but rather that the blood velocity open and close the valve.

It is to be understood that in its broadest sense this invention relates to an artificial heart check valve comprising a ring, a rod connected at one end to the ring with a portion of said rod passing through the center of the ring and a tapered check slidable over said portion, said check contacting the ring when the valve is in a closed position and forming an annular opening therebetween when the valve is in an open position. It is intended that other embodiments besides those shown in the drawings are included within the broadest scope of this invention including those modifications which will be apparent to those skilled in the art in the light of the foregoing detailed description.

I claim as my invention:

1. An artificial heart valve composed of materials of construction which are inert with respect to the human body and comprising in combination:
   (a) a ring member having an opening therein and an upstream end and a downstream end and a ledge-like seat extending therearound providing an annular seating surface facing downstream;
   (b) a rod member having a fixed end and a free terminal end, the fixed end being attached to said ring member and the fixed end portion of the rod member being disposed exteriorly of the ring opening and extending beyond and thence partially around one end of the ring member, and the terminal end portion of the rod member being substantially straight and axially disposed through the center of the ring opening, the length of said terminal end portion being at least sufficiently greater than the length of the check member, as defined in (c) below, to permit free axial movement of the check member between its open and closed positions;
   (c) an axially bored coniform check member slidably mounted on said terminal end portion of the rod member, the latter passing through said axial bore, the upstream surface of the check member being tapered and the downstream base portion of the check member forming a relatively thin outwardly extending lip edge of sufficient size to engage said annular seating surface of the ring member and thereby close the ring opening when the check member is in its closed position;
   (d) a stopping means carried by said terminal end portion of the rod member to limit the length of travel of said check member; and
   (e) means to attach said ring member to the human heart.

2. The heart valve of claim 1 further characterized in that said rod member comprises a U-shaped member formed by a first rod, a cross rod and a second rod, the end of the first rod being attached to the ring, and said check member being mounted on and slidable over the second rod.

3. The heart valve of claim 2 further characterized in that the U-shaped member is positioned such that the U is located upstream of the ring member with the open end of the U facing downstream.

4. The heart valve of claim 2 further characterized in that the U-shaped member is positioned such that the U is located downstream of the ring member with the open end of the U facing upstream, and the cross rod limits the travel of said check member at its open position.

5. The heart valve of claim 1 further characterized in that said check member comprises a polytetrafluoroethylene skeleton and a silicone outer body portion, said skeleton including a hollow axial core which slides over the terminal end portion of said rod member and a series of axially spaced protrusions extending radially from said core.

6. The heart valve of claim 5 further characterized in that the clearance between the terminal end portion of said rod member and said axial core is about 0.002 inch.

7. The heart valve of claim 1 further characterized in that the ledge-like seat of said ring member is formed on the downstream end thereof and has a convex seating surface.

8. The heart valve of claim 1 further characterized in that the tapered upstream surface of said check member is bell-shaped.

9. The heart valve of claim 1 further characterized in that the tapered upstream surface of said check member carries a series of fluting grooves to impart a twisting motion to the check member as it slides along the rod member.

10. The heart valve of claim 1 further characterized in that said ring member has an elliptical upstream end and a circular downstream end.

References Cited

UNITED STATES PATENTS

| | | | |
|---|---|---|---|
| 852,518 | 5/1907 | Murray | 137—533.27 |
| 1,588,874 | 6/1926 | Current | 137—533.27 |
| 1,595,832 | 8/1926 | Gleason | 137—331 |
| 1,844,613 | 2/1932 | Thompson | 137—533.27 X |

FOREIGN PATENTS

| | | |
|---|---|---|
| 1,016,811 | 1/1966 | Great Britain. |

OTHER REFERENCES

"Prosthetic Replacement of the Mitral Valve," in The Lancet, Nov. 24, 1962, p. 1087.

RICHARD A. GAUDET, *Primary Examiner.*

R. L. FRINKS, *Assistant Examiner.*

U.S. Cl. X.R.

137—331, 519, 533.27